(12) United States Patent
Xu et al.

(10) Patent No.: US 11,438,942 B2
(45) Date of Patent: Sep. 6, 2022

(54) METHOD FOR ESTABLISHING TUNNEL BETWEEN LOCAL GATEWAYS, AND GATEWAY

(71) Applicant: Huawei Technologies Co., Ltd., Shenzhen (CN)

(72) Inventors: Yixu Xu, Shanghai (CN); Han Zhou, Shenzhen (CN); Jin Zhang, Shanghai (CN); Zhongping Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/027,977

(22) Filed: Sep. 22, 2020

(65) Prior Publication Data

US 2021/0007161 A1    Jan. 7, 2021

Related U.S. Application Data

(63) Continuation of application No. 16/240,286, filed on Jan. 4, 2019, now Pat. No. 10,798,762, which is a
(Continued)

(51) Int. Cl.
*H04W 76/12* (2018.01)
*H04W 88/16* (2009.01)
(Continued)

(52) U.S. Cl.
CPC ............ *H04W 76/12* (2018.02); *H04W 8/08* (2013.01); *H04W 8/20* (2013.01); *H04W 36/08* (2013.01);
(Continued)

(58) Field of Classification Search
None
See application file for complete search history.

(56) References Cited

U.S. PATENT DOCUMENTS 9,686,317 B2    6/2017 Pancorbo Marcos et al.
2007/0091862 A1   4/2007 Ioannidis
(Continued)

FOREIGN PATENT DOCUMENTS

CN    101730170 A    6/2010
CN    101754305 A    6/2010
(Continued)

OTHER PUBLICATIONS

3rd Generation Partnership Project;Technical Specification Group Services and System Aspects; Study on control and user plane separation of EPC nodes (Release 14), 3GPP TR 23.714 V14.0 0 (Jun. 2016), 88 pages.
(Continued)

*Primary Examiner* — Eunsook Choi
(74) *Attorney, Agent, or Firm* — Slater Matsil, LLP

(57) ABSTRACT

A method for establishing a tunnel between local gateways, and a gateway are disclosed. The method includes: determining, by an RGW, that UE is handed over from an S-LGW to a T-LGW, where before the UE is handed over, a packet of a local service of the UE is forwarded by the S-LGW between the UE and an application server of the local service, and the local service includes a same service that is deployed on the S-LGW and that is accessed by the UE before and after the UE is handed over; sending, by the RGW to the S-LGW and the T-LGW respectively, a first request message and a second request message to request to establish a tunnel, where the tunnel is used to transmit the packet of the local service between the S-LGW and the T-LGW; and establishing the tunnel between the S-LGW and the T-LGW.

20 Claims, 8 Drawing Sheets

Related U.S. Application Data continuation of application No. PCT/CN2016/089182, filed on Jul. 7, 2016.

(51) Int. Cl.
| | |
|---|---|
| *H04W 36/10* | (2009.01) |
| *H04W 36/12* | (2009.01) |
| *H04W 76/11* | (2018.01) |
| *H04W 8/08* | (2009.01) |
| *H04W 8/20* | (2009.01) |
| *H04W 36/08* | (2009.01) |
| *H04W 92/24* | (2009.01) |

(52) U.S. Cl.
CPC .......... *H04W 36/10* (2013.01); *H04W 36/12* (2013.01); *H04W 76/11* (2018.02); *H04W 88/16* (2013.01); *H04W 92/24* (2013.01)

(56) References Cited

U.S. PATENT DOCUMENTS

| | | | |
|---|---|---|---|
| 2012/0246325 A1* | 9/2012 | Pancorbo Marcos | ............... H04L 63/102 709/227 |
| 2012/0302240 A1 | 11/2012 | Tamaki et al. | |
| 2012/0320876 A1 | 12/2012 | Zhou et al. | |
| 2015/0208291 A1* | 7/2015 | Lee | ............ H04W 36/0011 370/331 |
| 2016/0183156 A1* | 6/2016 | Chin | ............ H04L 61/2007 370/331 |
| 2017/0289898 A1 | 10/2017 | Youn et al. | |
| 2018/0227807 A1 | 8/2018 | Youn et al. | |

FOREIGN PATENT DOCUMENTS

| | | |
|---|---|---|
| CN | 101772105 A | 7/2010 |
| CN | 102196402 A | 9/2011 |
| WO | 2012127288 A1 | 9/2012 |

OTHER PUBLICATIONS

Cisco Systems, Inc., "Evaluation and conclusion for 'relocation of user plane function due to UE mobility' (clause 6.4)," SA WG2 Meeting #115, S2-162336, May 23-27, 2016, Nanjing, P.R. China, 4 pages.

Huawei, et al., "Solution to Key Issue 1-Single gateway controller," SA WG2 Meeting #112, S2-154089, Nov. 16-20, 2015, Anaheim, USA, 8 pages.

Huawei et al.,"Solution to Key Issue 4," SA WG2 Meeting #113, S2-160778, Jan. 25-29, 2016, Saint Kitts, KN, 4 pages.

* cited by examiner

METHOD FOR ESTABLISHING TUNNEL BETWEEN LOCAL GATEWAYS, AND GATEWAY

CROSS-REFERENCE TO RELATED APPLICATIONS

This application is a continuation of U.S. patent application Ser. No. 16/240,286, filed on Jan. 4, 2019, which is a continuation of International Application No. PCT/CN2016/089182, filed on Jul. 7, 2016. All of the afore-mentioned patent applications are hereby incorporated by reference in their entireties.

TECHNICAL FIELD

The present disclosure relates to the field of wireless communications, and in particular, to a method for establishing a tunnel between local gateways, and a gateway.

BACKGROUND

In a packet data network (PDN), when user equipment (UE) accesses a local service deployed on a local gateway (LGW), a remote gateway (RGW) parses a packet of the local service to obtain a packet processing policy of the local service. If the packet processing policy indicates that a local offload policy needs to be executed for the local service, the RGW sends a local offload policy to the LGW, or if a preset rule of the LGW indicates that a local offload policy needs to be executed for the local service, the LGW subsequently forwards the packet of the local service between the UE and an application server of the local service based on the local offload policy.

Because the UE moves, the UE is handed over from an original LGW to a new LGW. The LGW serving the UE before the UE moves is referred to as a source-local gateway (S-LGW) and a new LGW serving the UE after the UE moves is referred to as a target-local gateway (T-LGW) below. In the prior art, an uplink packet of a same local service accessed by the UE before and after the UE is handed over is used as an example, as shown in FIG. 1. Because the uplink packet needs to be sent to an application server by using the S-LGW, after the UE is handed over and sends the uplink packet to the RGW by using the T-LGW, if there is no tunnel between the RGW and the S-LGW, the uplink packet cannot be sent to the application server, and a transmission path of the uplink packet is interrupted, causing an interrupt of the local service accessed by the UE. Even if there is a tunnel between the RGW and the S-LGW, when the RGW sends the uplink packet to the application server through S-LGW forwarding, a problem of a roundabout path of the uplink packet also occurs. Similarly, a same problem as the uplink packet also occurs on a downlink packet of a local service being accessed by the UE before and after handover.

In conclusion, in a PDN, after the UE moves and the UE is handed over from the S-LGW to the T-LGW, the following prior-art problem is caused: A same local service accessed by the UE before and after handover is interrupted, or a roundabout packet path of a same local service accessed by the UE before and after handover occurs.

SUMMARY

Embodiments of the present disclosure provide a method for establishing a tunnel between local gateways, and a gateway, to resolve a prior-art problem that after UE is handed over from an S-LGW to a T-LGW, a same local service accessed by the UE before and after the UE is handed over is interrupted, or a roundabout packet path of a same local service accessed by the UE before and after handover occurs.

According to a first aspect, a method for establishing a tunnel between local gateways provided in an embodiment of the present disclosure includes: determining, by a remote gateway RGW, that user equipment UE is handed over from a source-local gateway S-LGW to a target-local gateway T-LGW, where before the UE is handed over, a packet of a local service of the UE is forwarded by the S-LGW between the UE and an application server of the local service, and the local service includes a same service that is deployed on the S-LGW and that is accessed by the UE before and after the UE is handed over; and sending, by the RGW to the S-LGW and the T-LGW respectively, a first request message and a second request message to request to establish a tunnel, where the tunnel is used to transmit the packet of the local service between the S-LGW and the T-LGW.

In this way, the RGW sends, to the S-LGW and the T-LGW respectively, the first request message and the second request message to request to establish a tunnel, so that after the S-LGW receives the first request message and the T-LGW receives the second request message, the S-LGW and the T-LGW establish the tunnel between them, where the tunnel is used to transmit, between the S-LGW and the T-LGW, a packet of a same local service accessed by the UE before and after the UE is handed over. Therefore, for an uplink packet of the local service, the T-LGW can send, to the S-LGW by using the tunnel, the uplink packet sent by the UE, and then the S-LGW sends the uplink packet to the application server of the local service. For a downlink packet of the local service, the S-LGW can send, to the T-LGW by using the tunnel, the downlink packet sent by the application server of the local service, and then the T-LGW sends the downlink packet to the UE. In this way, continuity of the same local service accessed by the UE before and after the UE is handed over is ensured after the UE is handed over, thereby avoiding a prior-art problem that the same local service accessed by the UE before and after the UE is handed over is interrupted, or a roundabout packet path of the same local service accessed by the UE before and after handover occurs.

In a possible implementation, the first request message includes a user plane identifier of the T-LGW and an identifier of the tunnel, and the second request message includes a user plane identifier of the S-LGW and the identifier of the tunnel.

In this way, after receiving the first request message, the S-LGW can establish the tunnel to the T-LGW based on the user plane identifier of the T-LGW and the identifier of the tunnel. After receiving the second request message, the T-LGW can establish the tunnel to the S-LGW based on the user plane identifier of the S-LGW and the identifier of the tunnel.

In a possible implementation, before the determining, by an RGW, that UE is handed over from an S-LGW to a T-LGW, the method further includes: receiving, by the RGW, flow information that is of the local service and that is sent by the S-LGW; and the first request message and the second request message further include the flow information of the local service, the first request message is further used to instruct the S-LGW to transmit the packet of the local service on the tunnel based on the flow information of the local service, and the second request message is further used to instruct the T-LGW to transmit the packet of the local service on the tunnel based on the flow information of the local service.

In this way, the S-LGW and the T-LGW can transmit the packet of the local service of the UE on the established tunnel based on the flow information of the local service.

In a possible implementation, the tunnel is used to transmit only the packet of the local service between the S-LGW and the T-LGW and is not used to transmit a packet of a service other than the local service.

If there are a plurality of same local services that are deployed on the S-LGW and that are accessed by the UE before and after the UE is handed over, the tunnel can be established between the S-LGW and the T-LGW based on a stream granularity. To be specific, the tunnel established between the S-LGW and the T-LGW is used to transmit only a packet of one of the plurality of local services between the S-LGW and the T-LGW, and is not used to transmit a packet of a service other than the local service. The first request message and the second request message may indicate that the tunnel established between the S-LGW and the T-LGW is used to transmit only a packet of which local service. Certainly, the tunnel established between the S-LGW and the T-LGW may also be used to transmit, between the S-LGW and the T-LGW, packets of some of the plurality of local services accessed by the UE before and after the UE is handed over.

In a possible implementation, before the sending, by the RGW to the S-LGW and the T-LGW respectively, a first request message and a second request message to request to establish a tunnel, the method further includes: obtaining, by the RGW, mobility subscription information of the UE, where the mobility subscription information of the UE is used to indicate that the UE has a service continuity function.

In this way, a solution of a customized service continuity function is performed based on a mobility requirement of the UE, so that network resources can be properly used, and a new mobile broadband service value-added point can also be provided for an operator.

In a possible implementation, before the sending, by the RGW to the S-LGW and the T-LGW respectively, a first request message and a second request message to request to establish a tunnel, the method further includes: obtaining, by the RGW, mobility subscription information of the local service, where the mobility subscription information of the local service is used to indicate that the local service has a service continuity function.

In this way, a solution of a customized service continuity function is performed based on a mobility requirement of a service, so that network resources can be properly used, and a new mobile broadband service value-added point can also be provided for an operator.

According to a second aspect, a method for establishing a tunnel between local gateways provided in an embodiment of the present disclosure includes: forwarding, by a source-local gateway S-LGW, a packet of a local service of user equipment UE between the UE and an application server of the local service; after the UE is handed over from the S-LGW to a target-local gateway T-LGW, receiving, by the S-LGW, a first request message that is used to request to establish a tunnel and that is sent by a remote gateway RGW, where the tunnel is used to transmit the packet of the local service between the S-LGW and the T-LGW, and the local service includes a same service that is deployed on the S-LGW and that is accessed by the UE before and after the UE is handed over; and establishing, by the S-LGW, the tunnel to the T-LGW after receiving the first request message.

In this way, after receiving the first request message, the S-LGW establishes the tunnel to the T-LGW, where the tunnel is used to transmit, between the S-LGW and the T-LGW, a packet of a same local service accessed by the UE before and after the UE is handed over. In this way, continuity of the same local service accessed by the UE before and after the UE is handed over is ensured after the UE is handed over, thereby avoiding a prior-art problem that the same local service accessed by the UE before and after the UE is handed over is interrupted, or a roundabout packet path of the same local service accessed by the UE before and after handover occurs.

In a possible implementation, the first request message includes a user plane identifier of the T-LGW and an identifier of the tunnel; and the establishing, by the S-LGW, the tunnel to the T-LGW includes: establishing, by the S-LGW, the tunnel to the T-LGW based on the user plane identifier of the T-LGW and the identifier of the tunnel.

In this way, after establishing the tunnel to the T-LGW, the S-LGW can transmit the packet of the local service of the UE by using the established tunnel.

In a possible implementation, before the UE is handed over from the S-LGW to the T-LGW, the method further includes: sending, by the S-LGW, flow information of the local service to the RGW, where the first request message includes the flow information of the local service, and the first request message is further used to instruct the S-LGW to transmit the packet of the local service on the tunnel based on the flow information of the local service.

In this way, the first request message includes the flow information of the local service, so that the S-LGW can transmit the packet of the local service on the established tunnel based on the flow information of the local service.

In a possible implementation, the tunnel is used to transmit only the packet of the local service between the S-LGW and the T-LGW and is not used to transmit a packet of a service other than the local service.

If there are a plurality of same local services that are deployed on the S-LGW and that are accessed by the UE before and after the UE is handed over, the tunnel can be established between the S-LGW and the T-LGW based on a stream granularity. To be specific, the tunnel established between the S-LGW and the T-LGW is used to transmit only a packet of one of the plurality of local services between the S-LGW and the T-LGW, and is not used to transmit a packet of a service other than the local service.

According to a third aspect, a method for establishing a tunnel between local gateways provided in an embodiment of the present disclosure includes: after user equipment UE is handed over from a source-local gateway S-LGW to a target-local gateway T-LGW, receiving, by the T-LGW, a second request message that is used to request to establish a tunnel and that is sent by a remote gateway RGW, where the tunnel is used to transmit a packet of a local service of the UE between the S-LGW and the T-LGW, the local service includes a same service that is deployed on the S-LGW and that is accessed by the UE before and after the UE is handed over, and before the UE is handed over, the packet of the local service of the UE is forwarded by the S-LGW between the UE and an application server of the local service; and establishing, by the T-LGW, the tunnel to the S-LGW after receiving the second request message.

In this way, after receiving the second request message, the T-LGW establishes the tunnel to the S-LGW, where the tunnel is used to transmit, between the S-LGW and the T-LGW, a packet of a same local service accessed by the UE before and after the UE is handed over. In this way, continuity of the same local service accessed by the UE before and after the UE is handed over is ensured after the UE is handed over, thereby avoiding a prior-art problem that the same local service accessed by the UE before and after the UE is handed over is interrupted, or a roundabout packet path of the same local service accessed by the UE before and after handover occurs.

In a possible implementation, the second request message includes a user plane identifier of the S-LGW and an identifier of the tunnel; and the establishing, by the T-LGW, the tunnel to the S-LGW includes: establishing, by the T-LGW, the tunnel to the S-LGW based on the user plane identifier of the S-LGW and the identifier of the tunnel.

In this way, after establishing the tunnel to the S-LGW, the T-LGW can transmit the packet of the local service of the UE by using the established tunnel.

In a possible implementation, the second request message further includes flow information of the local service, and the second request message is further used to instruct the T-LGW to transmit the packet of the local service on the tunnel based on the flow information of the local service.

In this way, the second request message includes the flow information of the local service, so that the T-LGW can transmit the packet of the local service on the established tunnel based on the flow information of the local service.

In a possible implementation, the tunnel is used to transmit only the packet of the local service between the S-LGW and the T-LGW and is not used to transmit a packet of a service other than the local service.

If there are a plurality of same local services that are deployed on the S-LGW and that are accessed by the UE before and after the UE is handed over, the tunnel can be established between the S-LGW and the T-LGW based on a stream granularity. To be specific, the tunnel established between the S-LGW and the T-LGW is used to transmit only a packet of one of the plurality of local services between the S-LGW and the T-LGW, and is not used to transmit a packet of a service other than the local service.

According to a fourth aspect, a remote gateway RGW provided in an embodiment of the present disclosure includes: a processing module, configured to determine that user equipment UE is handed over from a source-local gateway S-LGW to a target-local gateway T-LGW, where before the UE is handed over, a packet of a local service of the UE is forwarded by the S-LGW between the UE and an application server of the local service, and the local service includes a same service that is deployed on the S-LGW and that is accessed by the UE before and after the UE is handed over; and a transceiver module, configured to: after the processing module determines that the UE is handed over from the S-LGW to the T-LGW, send, to the S-LGW and the T-LGW respectively, a first request message and a second request message to request to establish a tunnel, where the tunnel is used to transmit the packet of the local service between the S-LGW and the T-LGW.

In this way, after the processing module determines that the UE is handed over from the S-LGW to the T-LGW, the transceiver module sends, to the S-LGW and the T-LGW respectively, the first request message and the second request message to request to establish a tunnel, so that after the S-LGW receives the first request message and the T-LGW receives the second request message, the S-LGW and the T-LGW establish the tunnel between them, where the tunnel is used to transmit, between the S-LGW and the T-LGW, a packet of a same local service accessed by the UE before and after the UE is handed over. Therefore, for an uplink packet of the local service, the T-LGW can send, to the S-LGW by using the tunnel, the uplink packet sent by the UE, and then the S-LGW sends the uplink packet to the application server of the local service. For a downlink packet of the local service, the S-LGW can send, to the T-LGW by using the tunnel, the downlink packet sent by the application server of the local service, and then the T-LGW sends the downlink packet to the UE. In this way, continuity of the same local service accessed by the UE before and after the UE is handed over is ensured after the UE is handed over, thereby avoiding a prior-art problem that the same local service accessed by the UE before and after the UE is handed over is interrupted, or a roundabout packet path of the same local service accessed by the UE before and after handover occurs.

In a possible implementation, the first request message includes a user plane identifier of the T-LGW and an identifier of the tunnel, and the second request message includes a user plane identifier of the S-LGW and the identifier of the tunnel.

In a possible implementation, the transceiver module is further configured to: before the processing module determines that the UE is handed over from the S-LGW to the T-LGW, receive flow information that is of the local service and that is sent by the S-LGW, where the first request message and the second request message further include the flow information of the local service, the first request message is further used to instruct the S-LGW to transmit the packet of the local service on the tunnel based on the flow information of the local service, and the second request message is further used to instruct the T-LGW to transmit the packet of the local service on the tunnel based on the flow information of the local service.

In a possible implementation, the tunnel is used to transmit only the packet of the local service between the S-LGW and the T-LGW and is not used to transmit a packet of a service other than the local service.

In a possible implementation, the transceiver module is further configured to: before sending, to the S-LGW and the T-LGW respectively, the first request message and the second request message to request to establish a tunnel, obtain mobility subscription information of the UE, where the mobility subscription information of the UE is used to indicate that the UE has a service continuity function.

In a possible implementation, the transceiver module is further configured to: before sending, to the S-LGW and the T-LGW respectively, the first request message and the second request message to request to establish a tunnel, obtain mobility subscription information of the local service, where the mobility subscription information of the local service is used to indicate that the local service has a service continuity function.

According to a fifth aspect, a source-local gateway S-LGW provided in an embodiment of the present disclosure includes: a transceiver module, configured to: before user equipment UE is handed over from the S-LGW to a target-local gateway T-LGW, forward a packet of a local service of the UE between the UE and an application server of the local service, where the transceiver module is further configured to: after the UE is handed over from the S-LGW to the T-LGW, receive a first request message that is used to request to establish a tunnel and that is sent by a remote gateway RGW, where the tunnel is used to transmit the packet of the local service between the S-LGW and the T-LGW, and the local service includes a same service that is deployed on the S-LGW and that is accessed by the UE before and after the UE is handed over; and a processing module, configured to establish the tunnel to the T-LGW after the transceiver module receives the first request message.

In this way, before the UE is handed over, the transceiver module forwards the packet of the local service of the UE between the UE and the application server of the local service, and after the UE is handed over, receives the first request message that is used to request to establish a tunnel and that is sent by the remote gateway RGW. The processing module establishes the tunnel to the T-LGW after the transceiver module receives the first request message. The tunnel is used to transmit, between the S-LGW and the T-LGW, a packet of a same local service accessed by the UE before and after the UE is handed over. In this way, continuity of the same local service accessed by the UE before and after the UE is handed over is ensured after the UE is handed over, thereby avoiding a prior-art problem that the same local service accessed by the UE before and after the UE is handed over is interrupted, or a roundabout packet path of the same local service accessed by the UE before and after handover occurs.

In a possible implementation, the first request message received by the transceiver module includes a user plane identifier of the T-LGW and an identifier of the tunnel; and the processing module is specifically configured to: establish the tunnel to the T-LGW based on the user plane identifier of the T-LGW and the identifier of the tunnel that are received by the transceiver module.

In a possible implementation, the transceiver module is further configured to: send flow information of the local service to the RGW before the UE is handed over from the S-LGW to the T-LGW, where the first request message received by the transceiver module includes the flow information of the local service, and the first request message is further used to instruct the S-LGW to transmit the packet of the local service on the tunnel based on the flow information of the local service.

In a possible implementation, the tunnel is used to transmit only the packet of the local service between the S-LGW and the T-LGW and is not used to transmit a packet of a service other than the local service.

According to a sixth aspect, a target-local gateway T-LGW provided in an embodiment of the present disclosure includes: a transceiver module, configured to: after user equipment UE is handed over from a source-local gateway S-LGW to the T-LGW, receive a second request message that is used to request to establish a tunnel and that is sent by a remote gateway RGW, where the tunnel is used to transmit a packet of a local service of the UE between the S-LGW and the T-LGW, the local service includes a same service that is deployed on the S-LGW and that is accessed by the UE before and after the UE is handed over, and before the UE is handed over, the packet of the local service of the UE is forwarded by the S-LGW between the UE and an application server of the local service; and a processing module, configured to establish the tunnel to the S-LGW after the transceiver module receives the second request message.

In this way, after the UE is handed over, the transceiver module receives the second request message that is used to request to establish a tunnel and that is sent by the RGW, and the processing module establishes the tunnel to the S-LGW after the transceiver module receives the second request message. The tunnel is used to transmit, between the S-LGW and the T-LGW, a packet of a same local service accessed by the UE before and after the UE is handed over. In this way, continuity of the same local service accessed by the UE before and after the UE is handed over is ensured after the UE is handed over, thereby avoiding a prior-art problem that the same local service accessed by the UE before and after the UE is handed over is interrupted, or a roundabout packet path of the same local service accessed by the UE before and after handover occurs.

In a possible implementation, the second request message received by the transceiver module includes a user plane identifier of the S-LGW and an identifier of the tunnel; and the processing module is specifically configured to: establish the tunnel to the S-LGW based on the user plane identifier of the S-LGW and the identifier of the tunnel that are received by the transceiver module.

In a possible implementation, the second request message further includes flow information of the local service, and the second request message is further used to instruct the T-LGW to transmit the packet of the local service on the tunnel based on the flow information of the local service.

In a possible implementation, the tunnel is used to transmit only the packet of the local service between the S-LGW and the T-LGW and is not used to transmit a packet of a service other than the local service.

DETAILED DESCRIPTION OF ILLUSTRATIVE EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
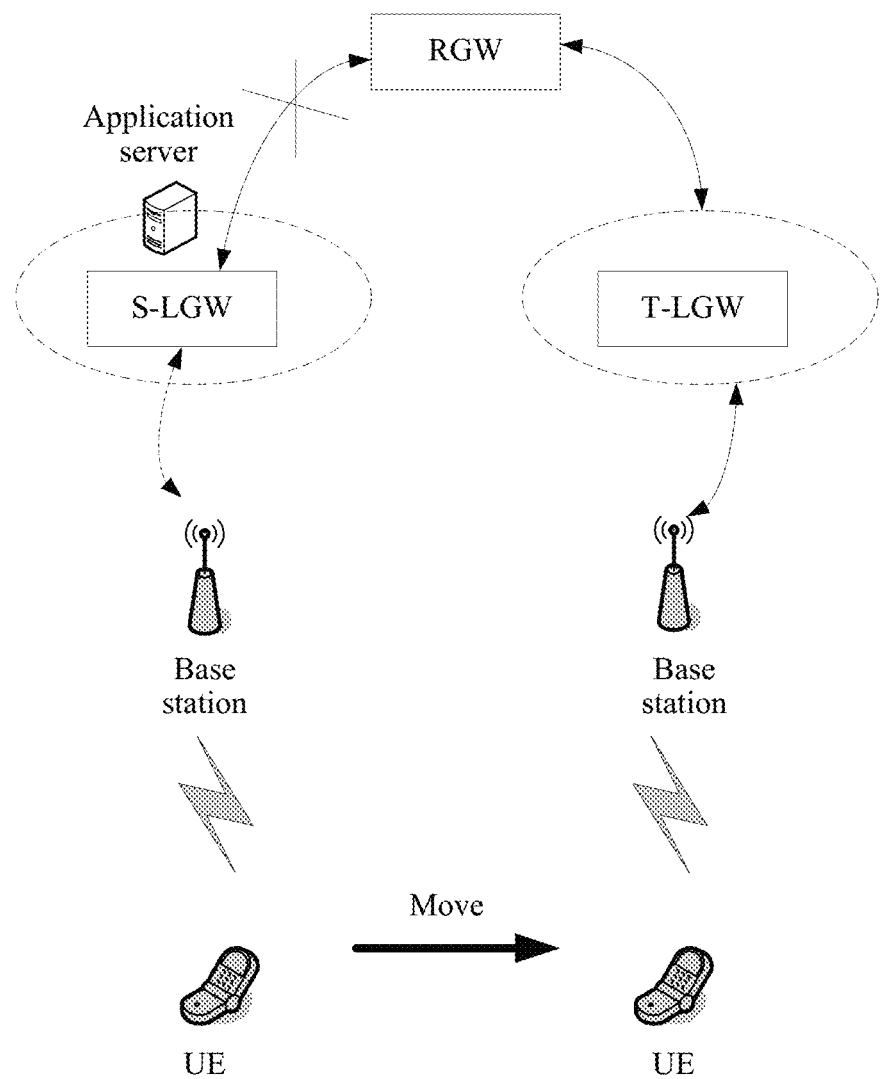
FIG. 1 is a schematic diagram of a transmission path of a packet of a local service accessed by UE in the prior art.

Because UE moves, the UE is handed over from a source-local gateway S-LGW to a target-local gateway T-LGW. The S-LGW and the T-LGW belong to one PDN. If the UE accesses, before and after the UE is handed over, a same local service deployed on the S-LGW, the S-LGW forwards a packet of the local service between the UE and an application server of the local service based on a local offload policy before a local gateway serving the UE is handed over. In the prior art, as shown in FIG. 1, the UE is handed over to the T-LGW, and if there is no tunnel between an RGW and the S-LGW, the same local service accessed by the UE before and after the UE is handed over is interrupted. Even if there is a tunnel between the RGW and the S-LGW, a problem of a roundabout packet path of the same local service accessed by the UE before and after the UE is handed over also occurs.

Figure 2:
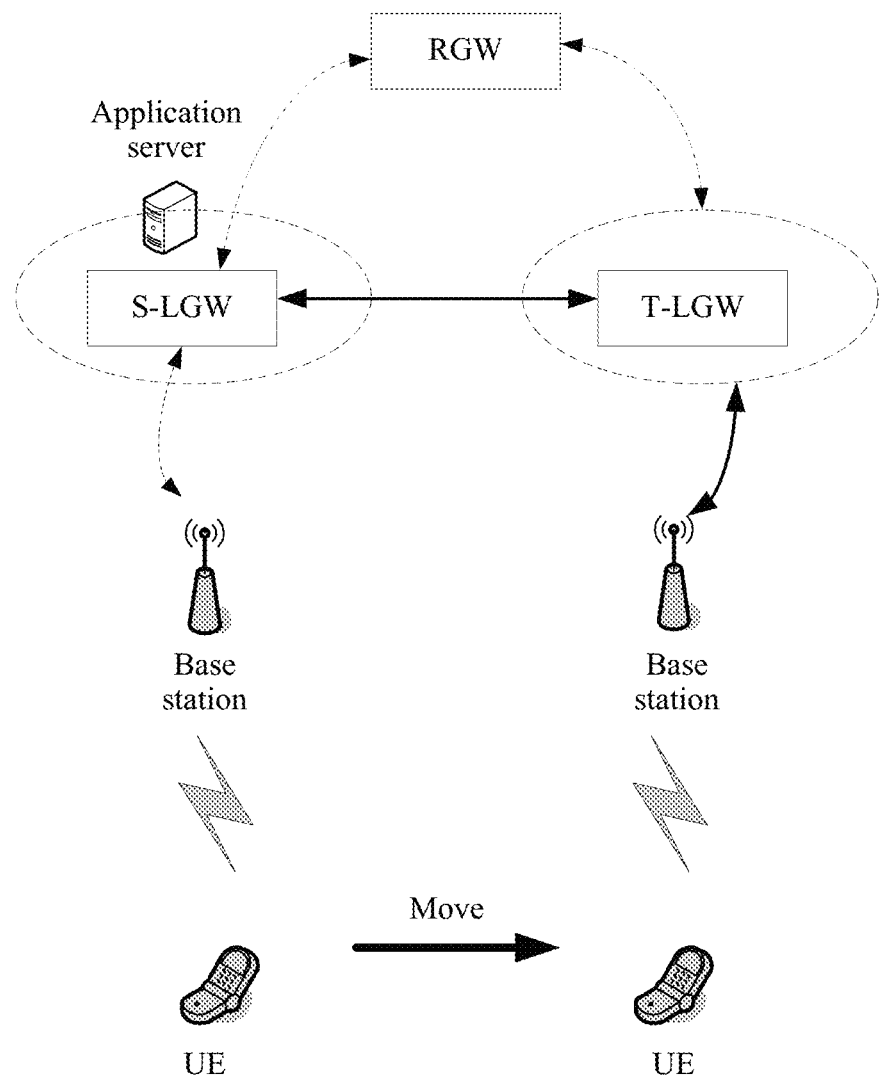
FIG. 2 is a schematic diagram of a transmission path of a packet of a local service accessed by UE in a technical solution according to an embodiment of the present disclosure.

The embodiments of the present disclosure provide a method for establishing a tunnel between local gateways, and a gateway, to resolve a prior-art problem that after UE is handed over from an S-LGW to a T-LGW, a same local service accessed by the UE before and after the UE is handed over is interrupted, or a roundabout packet path of a same local service accessed by the UE before and after handover occurs. In the technical solutions provided in the embodiments of the present disclosure, as shown in FIG. 2, when UE is handed over from an S-LGW to a T-LGW, an RGW instructs the S-LGW and the T-LGW to establish a tunnel therebetween. The tunnel is used to transmit, between the S-LGW and the T-LGW, a packet of a same local service accessed by the UE before and after the UE is handed over. After the S-LGW and the T-LGW establish the tunnel according to the instruction, the T-LGW can send, to the S-LGW by using the tunnel, an uplink packet sent by the UE, and then the S-LGW sends the uplink packet to an application server of the local service. Further, the S-LGW can send, to the T-LGW by using the tunnel, a downlink packet sent by the application server of the local service, and then the T-LGW sends the downlink packet to the UE. Therefore, in the technical solutions provided in the embodiments of the present disclosure, continuity of the same local service accessed by the UE before and after the UE is handed over can be ensured, thereby avoiding a prior-art problem that the same local service accessed by the UE before and after the UE is handed over is interrupted, or a roundabout packet path of the same local service accessed by the UE before and after handover occurs.

Figure 3A:
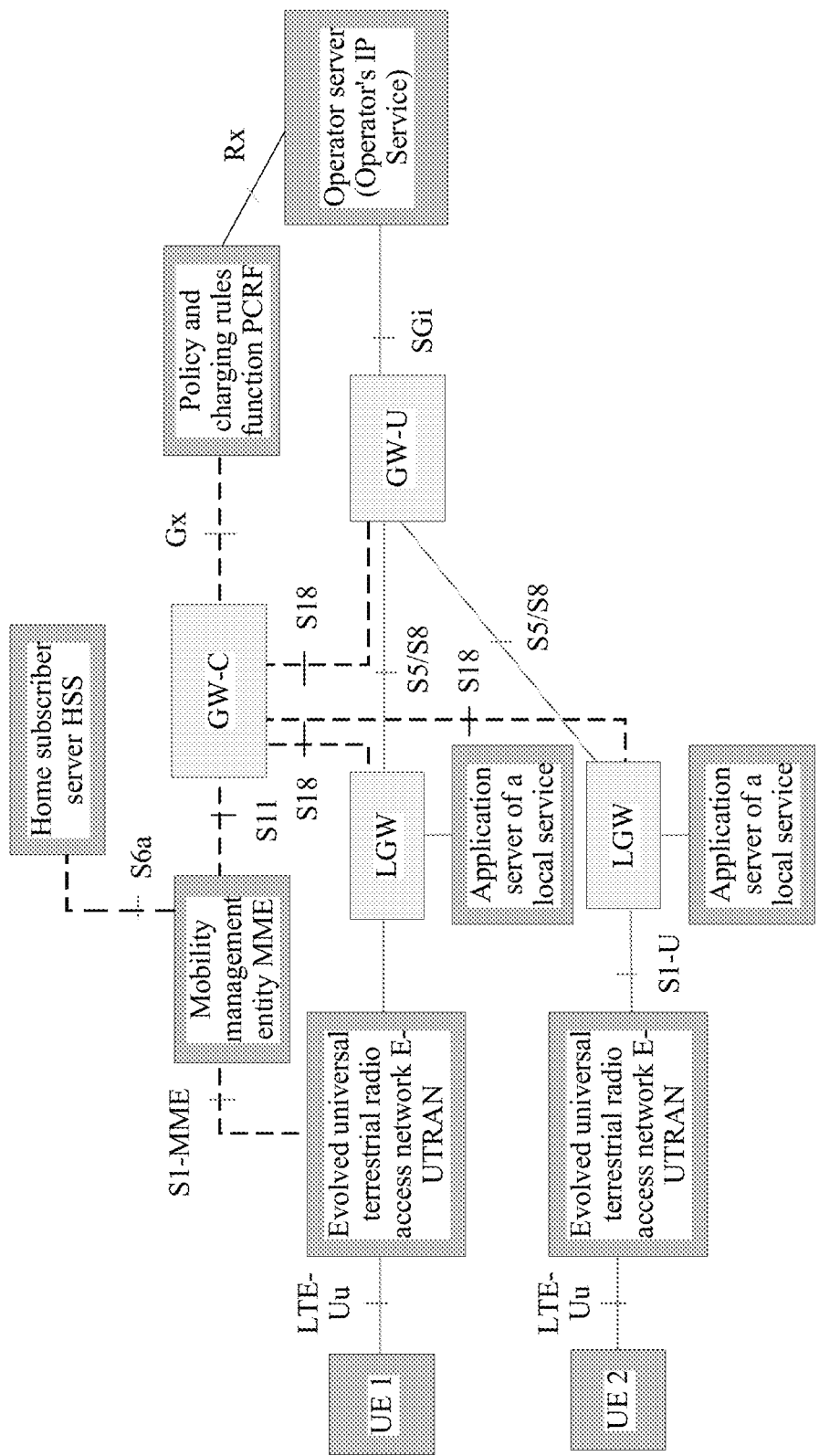
FIG. 3A is a schematic diagram of a gateway architecture in which distributed gateway control and forwarding are separated according to an embodiment of the present disclosure.
Figure 3B:
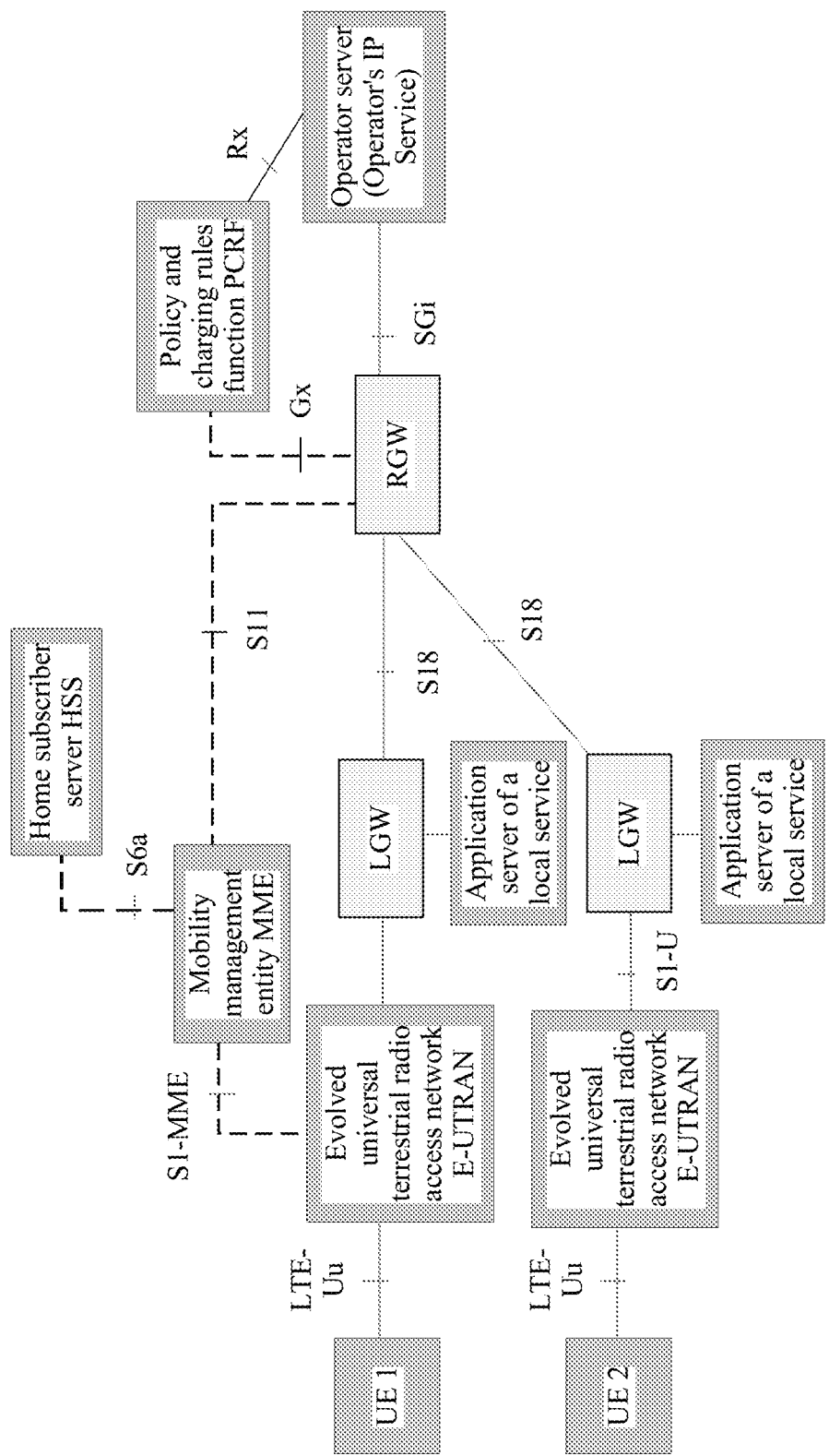
FIG. 3B is a schematic diagram of a gateway architecture in which distributed gateway control and forwarding are not separated according to an embodiment of the present disclosure.

Gateways in the technical solutions provided in the embodiment of the present disclosure include an RGW, an S-LGW, and a T-LGW. Based on deployment locations of forwarding planes, a gateway forwarding plane close to a UE side is referred to as a local gateway LGW, and a gateway forwarding plane at a PDN gateway location is referred to as a remote gateway RGW. In the embodiments of the present disclosure, as shown in FIG. 3A, a schematic diagram of a gateway architecture in which distributed gateway control and forwarding are separated may be used. A function of the RGW may be implemented by a gateway-control (GW-C) entity and a gateway-user (GW-U) entity in FIG. 3A. The GW-C entity is configured to implement a control plane function of the RGW. The GW-U entity is configured to implement a user plane function of the RGW. In the embodiments of the present disclosure, as shown in FIG. 3B, a schematic diagram of a gateway architecture in which distributed gateway control and forwarding are not separated may also be used. The RGW can implement a control plane function and a user plane function. An LGW in FIG. 3A and FIG. 3B may be the S-LGW or the T-LGW.

The embodiments of the present disclosure further relate to UE. The UE may be a device that provides voice and/or data connectivity for a user, a handheld device with a wireless connection function, or another processing device connected to a wireless modem. The wireless terminal device may communicate with one or more core networks through a radio access network (RAN). The wireless terminal device may be a mobile terminal device, such as a mobile phone (also referred to as a "cellular" phone) and a computer with a mobile terminal device, for example, may be a portable, pocket-sized, handheld, computer built-in, or in-vehicle mobile apparatus, which exchanges voice and/or data with the radio access network. For example, the wireless terminal device may be a device such as a personal communication service (PCS) phone, a cordless telephone set, a Session Initiation Protocol (SIP) phone, a wireless local loop (WLL) station, or a personal digital assistant (PDA). The wireless terminal device may also be referred to as a system, a subscriber unit, a subscriber station, a mobile station, a mobile console, a remote station, an access point, a remote terminal device, an access terminal device, a user terminal device, a user agent, a user device, or user equipment.

The embodiments of the present disclosure provide a method for establishing a tunnel between local gateways, and a gateway. The gateways include an RGW, an S-LGW, and a T-LGW. The method and the gateways are based on a same inventive concept. Because the method and the gateways use similar principles to resolve problems, mutual reference can be made to implementations of the gateways and the methods. No repetition is provided.

The technical solutions provided in the embodiments of the present disclosure are described in detail by using specific embodiments. It should be noted that, an order of presenting the embodiments represents only a sequence of the embodiments, and does not represent advantages or disadvantages of the technical solutions provided in the embodiments.

Embodiment 1

Figure 4:
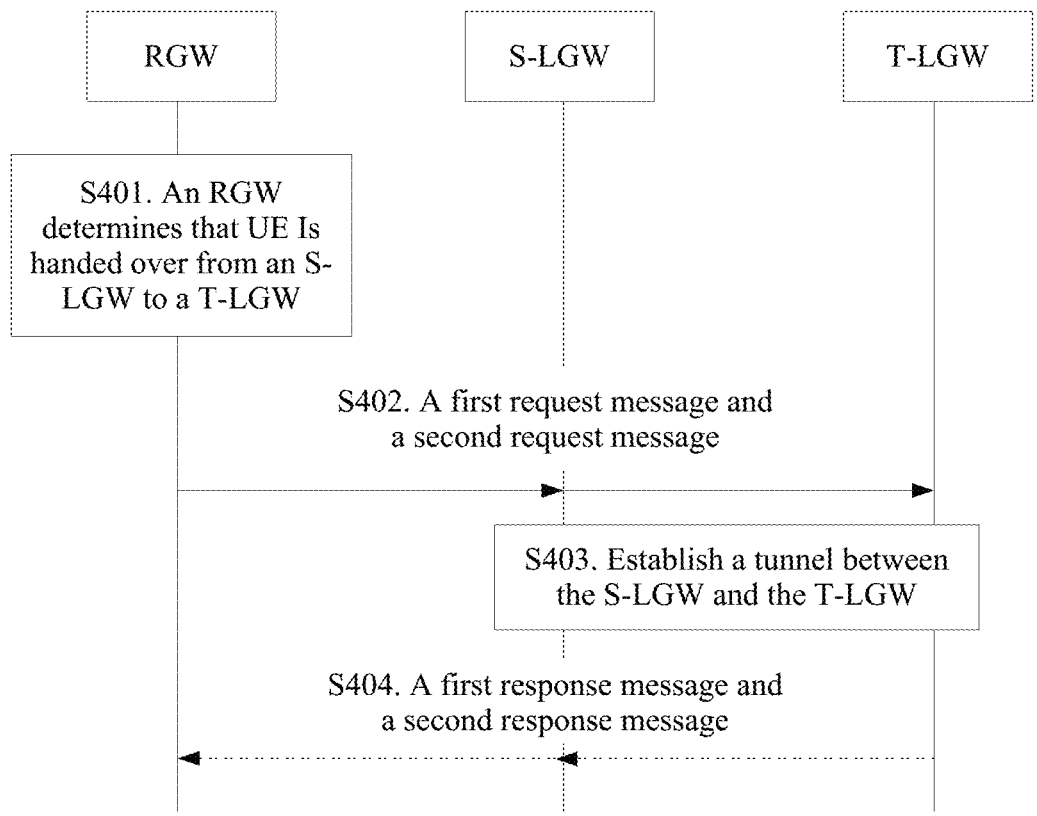
FIG. 4 is a schematic flowchart of a method for establishing a tunnel between local gateways according to an embodiment of the present disclosure.

As shown in FIG. 4, this embodiment of the present disclosure provides a method for establishing a tunnel between local gateways. The method includes the following steps.

S401. An RGW determines that UE is handed over from an S-LGW to a T-LGW.

Because the UE moves, the UE is handed over from the S-LGW to the T-LGW. The S-LGW and the T-LGW belong to a same PDN. The UE accesses, before and after the UE is handed over, a same local service deployed on the S-LGW.

Before the UE is handed over, the RGW parses a packet of the local service to obtain a packet processing policy of the local service. If the packet processing policy indicates that a local offload policy needs to be executed for the local service, the RGW sends the local offload policy to the S-LGW, or if a preset rule of the S-LGW indicates that a local offload policy needs to be executed for the local service, the S-LGW subsequently forwards the packet of the local service between the UE and an application server of the local service based on the local offload policy. After the UE is handed over, to ensure continuity of the same local service accessed by the UE before and after the UE is handed over, the following steps are performed.

S402. The RGW sends a first request message to the S-LGW, and the RGW sends a second request message to the T-LGW.

The first request message is used to request the S-LGW to establish a tunnel to the T-LGW. The first request message includes a user plane identifier of the T-LGW and an identifier of the tunnel. The second request message is used to request the T-LGW to establish a tunnel to the S-LGW. The second request message includes a user plane identifier of the S-LGW and the identifier of the tunnel. The identifier of the tunnel is configured by the RGW, the tunnel that is requested to be established between the S-LGW and the T-LGW is used to transmit the packet of the local service between the S-LGW and the T-LGW. The local service includes the same local service accessed by the UE before and after the UE is handed over.

Before the RGW determines that the UE is handed over from the S-LGW to the T-LGW, the S-LGW sends flow information of the local service to the RGW by using an interface between the S-LGW and the RGW. For example, the flow information of the local service may include a source Internet Protocol (IP) address of the packet, a destination IP address of the packet, and a quintet of the packet.

In this case, the first request message may further include the flow information of the local service. The first request message is used to instruct the S-LGW to transmit the packet of the local service on the established tunnel based on the flow information of the local service. The second request message may further include the flow information of the local service. The second request message is used to instruct the T-LGW to transmit the packet of the local service on the established tunnel based on the flow information of the local service.

S403. Establish a tunnel between the S-LGW and the T-LGW.

The S-LGW and the T-LGW separately establish the tunnel between the S-LGW and the T-LGW based on the user plane identifiers of the peer ends. The identifier of the established tunnel is the identifier that is of the tunnel and that is allocated by the RGW in the first request message and the second request message. The tunnel established between the S-LGW and the T-LGW is used to transmit the packet of the local service of the UE between the S-LGW and the T-LGW.

After the tunnel is established between the S-LGW and the T-LGW, as shown in FIG. 2, for the same local service accessed by the UE before and after the UE is handed over, the T-LGW sends, to the S-LGW by using the established tunnel, an uplink packet that is of the local service and that is sent by the UE, and then the S-LGW sends the uplink packet of the local service to the application server of the local service; or the S-LGW sends, to the T-LGW by using the established tunnel, a downlink packet that is of the local service and that is sent by the application server of the local service, and then the T-LGW sends the downlink packet of the local service to the UE.

Optionally, the method for establishing a tunnel between local gateways provided in this embodiment of the present disclosure further includes the following.

S404. The S-LGW sends a first response message to the RGW, and the T-LGW sends a second response message to the RGW.

The first response message is used to indicate that the S-LGW successfully establishes the tunnel to the T-LGW. The first response message includes the user plane identifier of the S-LGW, the user plane identifier of the T-LGW, and the identifier of the tunnel. The second response message is used to indicate that the T-LGW successfully establishes the tunnel to the S-LGW. The second response message includes the user plane identifier of the S-LGW, the user plane identifier of the T-LGW, and the identifier of the tunnel.

It should be noted that if there are a plurality of same local services that are deployed on the S-LGW and that are accessed by the UE before and after the UE is handed over, the S-LGW forwards packets of the plurality of local services between the UE and the application server of the local service before the UE is handed over. To ensure continuity of the plurality of local services accessed by the UE after handover, in S402, the first request message and the second request message may further include flow information of the plurality of local services. The first request message is further used to instruct the S-LGW to transmit the packets of the corresponding local services on the established tunnel based on the flow information of the plurality of local services. The second request message is further used to instruct the T-LGW to transmit the packets of the corresponding local services on the established tunnel based on the flow information of the plurality of local services.

Optionally, if there are a plurality of same local services that are deployed on the S-LGW and that are accessed by the UE before and after the UE is handed over, the tunnel can be established between the S-LGW and the T-LGW based on a stream granularity. To be specific, the tunnel established between the S-LGW and the T-LGW is used to transmit only a packet of one of the plurality of local services between the S-LGW and the T-LGW, and is not used to transmit a packet of a service other than the local service. The first request message and the second request message may indicate that the tunnel established between the S-LGW and the T-LGW is used to transmit only a packet of which local service. Certainly, the tunnel established between the S-LGW and the T-LGW may also be used to transmit, between the S-LGW and the T-LGW, packets of some of the plurality of local services accessed by the UE before and after the UE is handed over.

This embodiment further provides a solution that a customized service continuity function is performed based on a mobility requirement of the UE, so that network resources can be properly used, and a new mobile broadband service value-added point can also be provided for an operator. The solution is as follows.

Before sending the first request message to the S-LGW and sending the second request message to the T-LGW, the RGW obtains mobility subscription information of the UE. The mobility subscription information of the UE indicates whether the UE has a service continuity function. If the mobility subscription information of the UE indicates that the UE has the service continuity function, it indicates that after the local gateway serving the UE is handed over, service continuity of the UE needs to be ensured. In this case, the RGW sends the first request message to the S-LGW, and sends the second request message to the T-LGW, to request to establish the tunnel between the S-LGW and the T-LGW. The tunnel is used to transmit, between the S-LGW and the T-LGW, a packet of a local service being accessed by the UE before and after the UE is handed over. If the mobility subscription information of the UE indicates that the UE does not have the service continuity function, it indicates that after the local gateway serving the UE is handed over, service continuity of the UE does not need to be ensured, and the method for establishing a tunnel between local gateways provided in this embodiment does not need to be performed.

Optionally, the RGW may obtain the mobility subscription information of the UE from a policy and charging rules function (PCRF) entity. To be specific, after determining that the UE is handed over from the S-LGW to the T-LGW, the RGW may send a request message to the PCRF by using an interface between the RGW and the PCRF. The request message is used to request to query the mobility subscription information of the UE. After receiving the request message sent by the RGW, the PCRF queries a subscription database to obtain the mobility subscription information of the UE, encapsulates the mobility subscription information of the UE in a response message, and sends the response message to the RGW. The RGW may learn, by parsing the mobility subscription information of the UE in the received response message, whether the UE has the service continuity function.

This embodiment further provides a solution that a customized service continuity function is performed based on a mobility requirement of a service, so that network resources can be properly used, and a new mobile broadband service value-added point can also be provided for an operator. The solution is as follows:

Before sending the first request message to the S-LGW and sending the second request message to the T-LGW, the RGW obtains mobility subscription information of the local service. The mobility subscription information of the local service indicates whether the local service has a service continuity function. If the mobility subscription information of the local service indicates that the local service has the service continuity function, it indicates that after the local gateway serving the UE is handed over, service continuity of the local service needs to be ensured. In this case, the RGW sends the first request message to the S-LGW, and sends the second request message to the T-LGW, to request to establish the tunnel between the S-LGW and the T-LGW. The tunnel is used to transmit, between the S-LGW and the T-LGW, the packet of the local service accessed by the UE before and after the UE is handed over. If the mobility subscription information of the local service indicates that the local service does not have the service continuity function, it indicates that after the local gateway serving the UE is handed over, service continuity of the local service does not need to be ensured, and the method for establishing a tunnel between local gateways provided in this embodiment does not need to be performed.

Optionally, the RGW may obtain the mobility subscription information of the local service from a PCRF entity. To be specific, after determining that the UE is handed over from the S-LGW to the T-LGW, the RGW sends a request message to the PCRF by using an interface between the RGW and the PCRF. The request message is used to request to query mobility subscription information of a local service being accessed by the UE before and after the UE is handed over. After receiving the request message sent by the RGW, the PCRF queries a subscription database to obtain the mobility subscription information of the local service, encapsulates the mobility subscription information of the local service in a response message, and sends the response message to the RGW. The RGW may learn, by parsing the mobility subscription information of the local service in the received response message, whether the local service has the service continuity function.

Alternatively, the RGW may obtain the mobility subscription information of the local service from the S-LGW. The S-LGW stores the mobility subscription information of the local service deployed on the S-LGW. Before the local gateway serving the UE is handed over and when the UE accesses the local service, the S-LGW sends the mobility subscription information of the local service to the RGW. In this embodiment, an identifier may be set to enable the mobility subscription information of the local service to indicate whether the local service has service continuity.

It should be particularly noted that in this embodiment, the local service transmitted on the tunnel established between the S-LGW and the T-LGW is the same local service that is deployed on the S-LGW and that is accessed by the UE after and before the local gateway serving the UE is handed over. After the local gateway serving the UE is handed over, the UE accesses a new local service deployed on the T-LGW. The T-LGW may forward a packet of the new local service between the UE and an application server of the new local service.

This embodiment of the present disclosure provides the method for establishing a tunnel between local gateways, and a gateway, to resolve a prior-art problem that after the UE is handed over from the S-LGW to the T-LGW, the same local service accessed by the UE before and after the UE is handed over is interrupted, or a roundabout packet path of the same local service accessed by the UE before and after handover occurs. In the technical solutions provided in this embodiment of the present disclosure, after the UE is handed over from the S-LGW to the T-LGW, the RGW instructs the S-LGW and the T-LGW to establish the tunnel between them, where the tunnel is used to transmit, between the S-LGW and the T-LGW, the packet of the same local service accessed by the UE before and after the UE is handed over. After the S-LGW and the T-LGW establish the tunnel according to the instruction, the T-LGW can send, to the S-LGW by using the tunnel, the uplink packet sent by the UE, and then the S-LGW sends the uplink packet to the application server of the local service. Further, the S-LGW can send, to the T-LGW by using the tunnel, the downlink packet sent by the application server of the local service, and then the T-LGW sends the downlink packet to the UE. Therefore, in the technical solutions provided in this embodiment of the present disclosure, continuity of the same local service accessed by the UE before and after the local gateway serving the UE is handed over can be ensured, thereby avoiding a prior-art problem that the same local service accessed by the UE before and after the UE is handed over is interrupted, or the roundabout packet path of the same local service accessed by the UE before and after the UE is handed over occurs.

Embodiment 2

Figure 5:
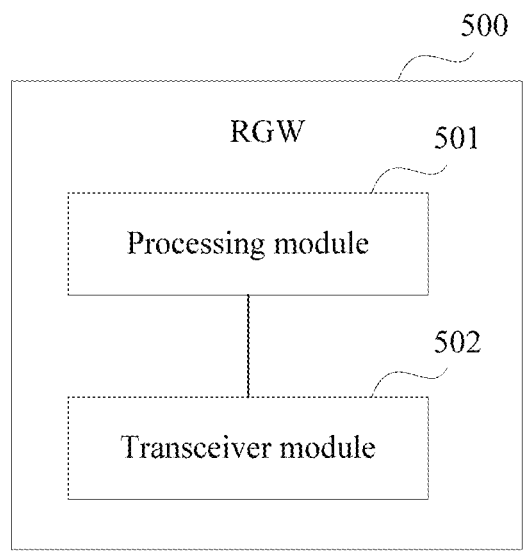
FIG. 5 is a schematic structural diagram of a remote gateway RGW according to an embodiment of the present disclosure.

This embodiment of the present disclosure further provides a remote gateway RGW. The RGW may perform the method corresponding to the RGW in FIG. 4 of Embodiment 1. As shown in FIG. 5, the RGW 500 includes a processing module 501 and a transceiver module 502.

The processing module 501 is configured to determine that user equipment UE is handed over from a source-local gateway S-LGW to a target-local gateway T-LGW, where before the UE is handed over, a packet of a local service of the UE is forwarded by the S-LGW between the UE and an application server of the local service, and the local service includes a same service that is deployed on the S-LGW and that is accessed by the UE before and after the UE is handed over.

The transceiver module 502 is configured to: after the processing module 501 determines that the UE is handed over from the S-LGW to the T-LGW, send, to the S-LGW and the T-LGW respectively, a first request message and a second request message to request to establish a tunnel, where the tunnel is used to transmit the packet of the local service between the S-LGW and the T-LGW.

Optionally, the first request message includes a user plane identifier of the T-LGW and an identifier of the tunnel, and the second request message includes a user plane identifier of the S-LGW and the identifier of the tunnel.

Optionally, the transceiver module 502 is further configured to: before the processing module 501 determines that the UE is handed over from the S-LGW to the T-LGW, receive flow information that is of the local service and that is sent by the S-LGW, where the first request message and the second request message further include the flow information of the local service, the first request message is further used to instruct the S-LGW to transmit the packet of the local service on the tunnel based on the flow information of the local service, and the second request message is further used to instruct the T-LGW to transmit the packet of the local service on the tunnel based on the flow information of the local service.

Optionally, the tunnel is used to transmit only the packet of the local service between the S-LGW and the T-LGW and is not used to transmit a packet of a service other than the local service.

If there are a plurality of same local services that are deployed on the S-LGW and that are accessed by the UE before and after the UE is handed over, the tunnel can be established between the S-LGW and the T-LGW based on a stream granularity. To be specific, the tunnel established between the S-LGW and the T-LGW is used to transmit only a packet of one of the plurality of local services between the S-LGW and the T-LGW, and is not used to transmit a packet of a service other than the local service. The first request message and the second request message may indicate that the tunnel established between the S-LGW and the T-LGW is used to transmit only a packet of which local service. Certainly, the tunnel established between the S-LGW and the T-LGW may also be used to transmit, between the S-LGW and the T-LGW, packets of some of the plurality of local services accessed by the UE before and after the UE is handed over.

Optionally, the transceiver module 502 is further configured to: before sending, to the S-LGW and the T-LGW respectively, the first request message and the second request message to request to establish a tunnel, obtain mobility subscription information of the UE, where the mobility subscription information of the UE is used to indicate that the UE has a service continuity function.

A solution of a customized service continuity function is performed based on a mobility requirement of the UE, so that network resources can be properly used, and a new mobile broadband service value-added point can also be provided for an operator. The mobility subscription information of the UE indicates whether the UE has the service continuity function. If the mobility subscription information of the UE indicates that the UE has the service continuity function, it indicates that after the local gateway serving the UE is handed over, service continuity of the UE needs to be ensured. In this case, the transceiver module 502 sends the first request message to the S-LGW, and sends the second request message to the T-LGW, to request to establish the tunnel between the S-LGW and the T-LGW. The tunnel is used to transmit, between the S-LGW and the T-LGW, a packet of a local service being accessed by the UE before and after the UE is handed over. If the mobility subscription information of the UE indicates that the UE does not have the service continuity function, it indicates that after the local gateway serving the UE is handed over, service continuity of the UE does not need to be ensured, and after the UE is handed over, the transceiver module 502 does not need to request to establish the tunnel between the S-LGW and the T-LGW.

Optionally, when obtaining the mobility subscription information of the UE, the transceiver module 502 is specifically configured to: send a request message to a PCRF, where the request message is used to request to query the mobility subscription information of the UE, where after receiving the request message sent by the RGW, the PCRF queries a subscription database to obtain the mobility subscription information of the UE, and encapsulates the mobility subscription information of the UE in a response message; and receive the response message sent by the PCRF, where the response message includes the mobility subscription information of the UE.

Optionally, the transceiver module 502 is further configured to: before sending, to the S-LGW and the T-LGW respectively, the first request message and the second request message to request to establish a tunnel, obtain mobility subscription information of the local service, where the mobility subscription information of the local service is used to indicate that the local service has a service continuity function.

A solution of a customized service continuity function is performed based on a mobility requirement of a service, so that network resources can be properly used, and a new mobile broadband service value-added point can also be provided for an operator. The mobility subscription information of the local service indicates whether the local service has the service continuity function. If the mobility subscription information of the local service indicates that the local service has the service continuity function, it indicates that after the local gateway serving the UE is handed over, service continuity of the local service needs to be ensured. In this case, the transceiver module 502 sends the first request message to the S-LGW, and sends the second request message to the T-LGW, to request to establish the tunnel between the S-LGW and the T-LGW. The tunnel is used to transmit, between the S-LGW and the T-LGW, the packet of the local service accessed by the UE before and after the UE is handed over. If the mobility subscription information of the local service indicates that the local service does not have the service continuity function, it indicates that after the local gateway serving the UE is handed over, service continuity of the local service does not need to be ensured, and after the UE is handed over, the transceiver module 502 does not need to request to establish the tunnel between the S-LGW and the T-LGW.

When obtaining the mobility subscription information of the local service, the transceiver module 502 is specifically configured to: send a request message to a PCRF, where the request message is used to request to query mobility subscription information of a local service being accessed by the UE before and after the UE is handed over, where after receiving the request message sent by the RGW, the PCRF queries a subscription database to obtain the mobility subscription information of the local service, and encapsulates the mobility subscription information of the local service in a response message; and receive the response message sent by the PCRF, where the response message includes the mobility subscription information of the local service; or send a request message to the S-LGW, where the request message is used to request the mobility subscription information of the local service, where the S-LGW stores the mobility subscription information of the local service deployed on the S-LGW; and receive a response message sent by the S-LGW, where the response message includes the mobility subscription information of the local service.

It should be noted that the division of the modules in the embodiments of the present disclosure is schematic and is merely a logical function division. In an actual implementation, there may be another division manner. In addition, functional modules in the embodiments of this application may be integrated into one processing unit, or each of the modules may exist alone physically, or two or more modules are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

Figure 6:
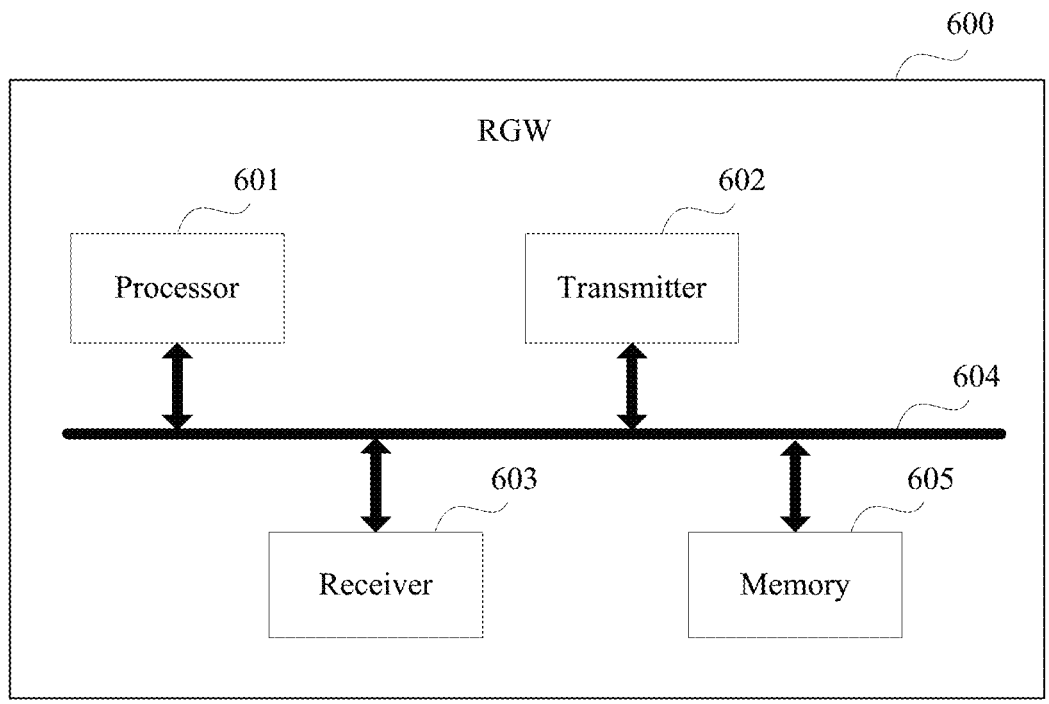
FIG. 6 is a schematic structural diagram of another remote gateway RGW according to an embodiment of the present disclosure.

Based on the foregoing embodiment, this embodiment of the present disclosure further provides a remote gateway RGW. The RGW may perform the method corresponding to the RGW in FIG. 4 of Embodiment 1, and may be a same device as the RGW shown in FIG. 5. Referring to FIG. 6, the RGW 600 includes a processor 6o1, a transmitter 602, a receiver 603, a bus 604, and a memory 605.

The processor 601, the transmitter 602, the receiver 603, and the memory 605 are connected to each other by using the bus 604. The bus 604 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 6, but this does not mean that there is only one bus or only one type of bus.

The processor 6o1 in FIG. 6 corresponds to the processing module 501 in FIG. 5, the transmitter 602 and the receiver 603 in FIG. 6 correspond to the transceiver module 502 in FIG. 5. The transmitter 602 may be configured to implement a data sending function of the transceiver module 502. The receiver 603 is configured to implement a data receiving function of the transceiver module 502. The RGW 600 further includes the memory 605, configured to store a program and the like. Specifically, the program may include program code, and the program code includes a computer operation instruction. The memory 605 may include a random access memory (RAM), or may further include a non-volatile memory, for example, at least one magnetic disk memory. The processor 601 executes an application program stored in the memory 605, to implement the foregoing method for establishing a tunnel between local gateways.

Embodiment 3

Figure 7:
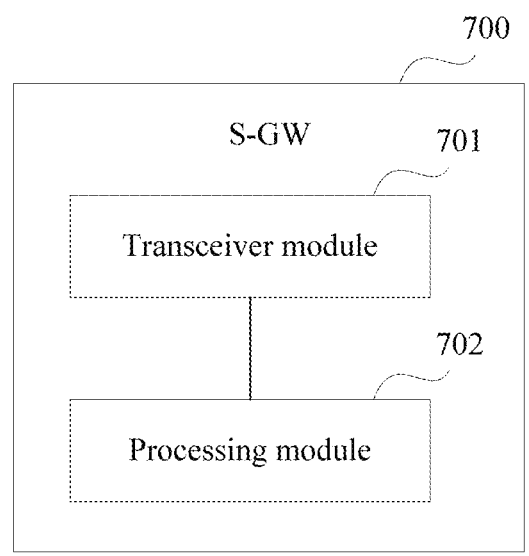
FIG. 7 is a schematic structural diagram of a source-local gateway S-LGW according to an embodiment of the present disclosure.

This embodiment of the present disclosure further provides a source-local gateway S-LGW. The S-LGW may perform the method corresponding to the S-LGW in FIG. 4 of Embodiment 1. As shown in FIG. 7, the S-LGW 700 includes a transceiver module 701 and a processing module 702.

The transceiver module 701 is configured to: before user equipment UE is handed over from the S-LGW to a target-local gateway T-LGW, forward a packet of a local service of the UE between the UE and an application server of the local service.

The transceiver module 701 is further configured to: after the UE is handed over from the S-LGW to the T-LGW, receive a first request message that is used to request to establish a tunnel and that is sent by a remote gateway RGW, where the tunnel is used to transmit the packet of the local service between the S-LGW and the T-LGW, and the local service includes a same service that is deployed on the S-LGW and that is accessed by the UE before and after the UE is handed over.

The processing module 702 is configured to establish the tunnel to the T-LGW after the transceiver module 701 receives the first request message.

Optionally, the first request message received by the transceiver module 701 includes a user plane identifier of the T-LGW and an identifier of the tunnel.

The processing module 702 is specifically configured to: establish the tunnel to the T-LGW based on the user plane identifier of the T-LGW and the identifier of the tunnel that are received by the transceiver module 701.

Optionally, the transceiver module 701 is further configured to: send flow information of the local service to the RGW before the UE is handed over from the S-LGW to the T-LGW.

The first request message received by the transceiver module 701 includes the flow information of the local service, and the first request message is further used to instruct the S-LGW to transmit the packet of the local service on the tunnel based on the flow information of the local service.

Optionally, the tunnel is used to transmit only the packet of the local service between the S-LGW and the T-LGW and is not used to transmit a packet of a service other than the local service.

Figure 8:
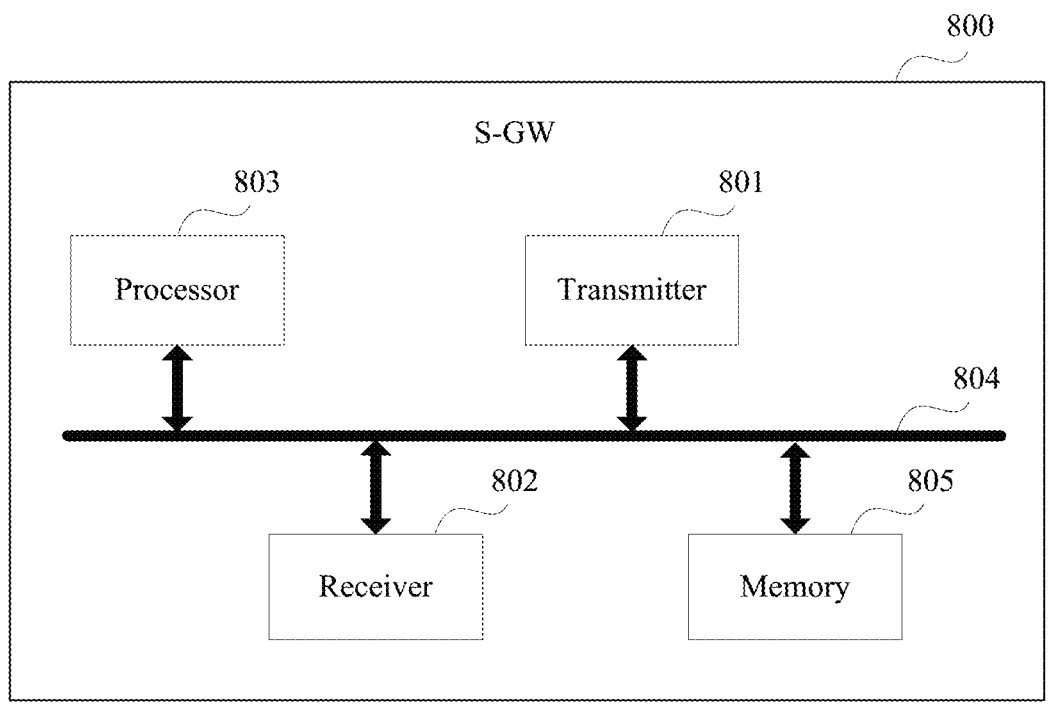
FIG. 8 is a schematic structural diagram of another source-local gateway S-GW according to an embodiment of the present disclosure.

Based on the foregoing embodiment, this embodiment of the present disclosure further provides a source-local gateway S-LGW. The S-LGW may perform the method corresponding to the S-LGW in FIG. 4 of Embodiment 1, and may be a same device as the S-LGW shown in FIG. 7. Referring to FIG. 8, the S-LGW 800 includes a transmitter 801, a receiver 802, a processor 803, a bus 804, and a memory 805.

The transmitter 801, the receiver 802, the processor 803, and the memory 805 are connected to each other by using the bus 804. The bus 804 may be a PCI bus, an EISA bus, or the like. The bus may be classified into an address bus, a data bus, a control bus, and the like. For ease of representation, only one thick line is used to represent the bus in FIG. 8, but this does not mean that there is only one bus or only one type of bus.

The transmitter 801 and the receiver 802 in FIG. 8 correspond to the transceiver module 701 in FIG. 7. The transmitter 801 may be configured to implement a data sending function of the transceiver module 701. The receiver 802 is configured to implement a data receiving function of the transceiver module 701. The processor 803 in FIG. 8 corresponds to the processing module 702 in FIG. 7. The S-LGW 800 further includes the memory 805, configured to store a program and the like. Specifically, the program may include program code, and the program code includes a computer operation instruction. The memory 805 may include a RAM, or may further include a non-volatile memory, for example, at least one magnetic disk memory. The processor 803 executes an application program stored in the memory 805, to implement the foregoing method for establishing a tunnel between local gateways.

Embodiment 4

Figure 9:
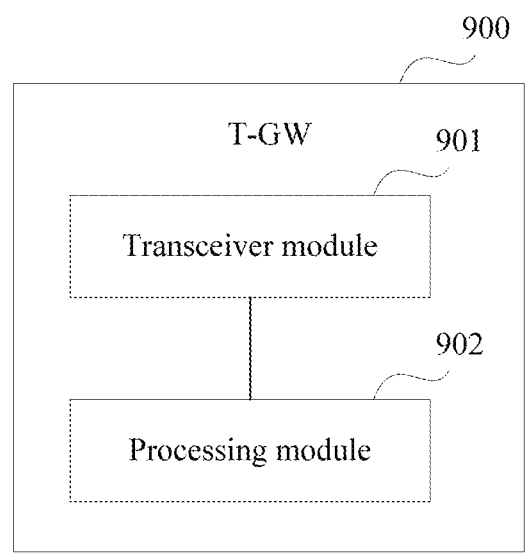
FIG. 9 is a schematic structural diagram of a target-local gateway T-LGW according to an embodiment of the present disclosure.

This embodiment of the present disclosure provides a target-local gateway T-LGW. The T-LGW may perform the method corresponding to the T-LGW in FIG. 4 of Embodiment 1. As shown in FIG. 9, the T-LGW 900 includes a transceiver module 901 and a processing module 902.

The transceiver module 901 is configured to: after user equipment UE is handed over from a source-local gateway S-LGW to the T-LGW, receive a second request message that is used to request to establish a tunnel and that is sent by a remote gateway RGW, where the tunnel is used to transmit a packet of a local service of the UE between the S-LGW and the T-LGW, the local service includes a same service that is deployed on the S-LGW and that is accessed by the UE before and after the UE is handed over, and before the UE is handed over, the packet of the local service of the UE is forwarded by the S-LGW between the UE and an application server of the local service.

The processing module 902 is configured to establish the tunnel to the S-LGW after the transceiver module 901 receives the second request message.

Optionally, the second request message received by the transceiver module 901 includes a user plane identifier of the S-LGW and an identifier of the tunnel.

The processing module 902 is specifically configured to: establish the tunnel to the S-LGW based on the user plane identifier of the S-LGW and the identifier of the tunnel that are received by the transceiver module 901.

Optionally, the second request message further includes flow information of the local service, and the second request message is further used to instruct the T-LGW to transmit the packet of the local service on the tunnel based on the flow information of the local service.

Optionally, the tunnel is used to transmit only the packet of the local service between the S-LGW and the T-LGW and is not used to transmit a packet of a service other than the local service.

Figure 10:
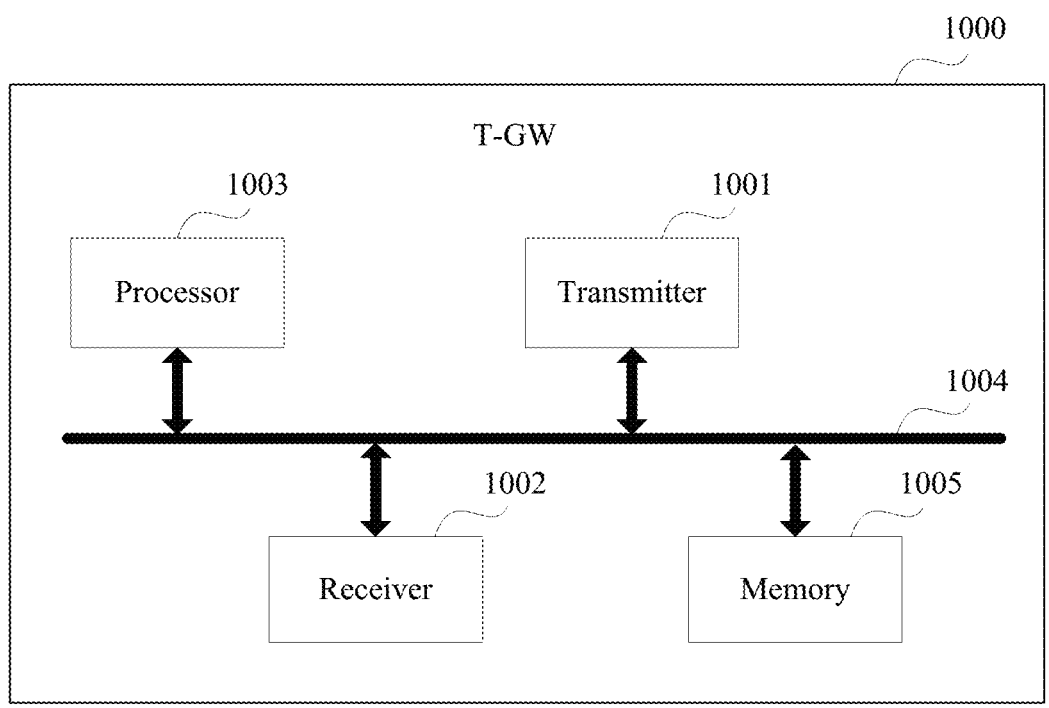
FIG. 10 is a schematic structural diagram of another target-local gateway T-LGW according to an embodiment of the present disclosure.

Based on the foregoing embodiment, this embodiment of the present disclosure further provides a target-local gateway T-LGW. The T-LGW may perform the method corresponding to the T-LGW in FIG. 4 of Embodiment 1, and may be a same device as the T-LGW shown in FIG. 9. Referring to FIG. 10, the T-LGW 1000 includes a transmitter 1001, a receiver 1002, a processor 1003, a bus 1004, and a memory 1005.

The transmitter 1001, the receiver 1002, the processor 1003, and the memory 1005 are connected to each other by using the bus 1004. The bus 1004 may be a PCI bus, an EISA bus, or the like. The bus may be classified into an address bus, a data bus, a control bus, and the like. For ease of representation, only one thick line is used to represent the bus in FIG. 10, but this does not mean that there is only one bus or only one type of bus.

The transmitter 1001 and the receiver 1002 in FIG. 10 correspond to the transceiver module 901 in FIG. 9. The transmitter 1001 may be configured to implement a data sending function of the transceiver module 901. The receiver 1002 is configured to implement a data receiving function of the transceiver module 901. The processor 1003 in FIG. 10 corresponds to the processing module 902 in FIG. 9. The T-LGW 1000 further includes the memory 1005, configured to store a program and the like. Specifically, the program may include program code, and the program code includes a computer operation instruction. The memory 1005 may include a RAM, or may further include a non-volatile memory, for example, at least one magnetic disk memory. The processor 1003 executes an application program stored in the memory 1005, to implement the foregoing method for establishing a tunnel between local gateways.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, a person skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method, comprising:
transmitting, by a source local gateway, a first packet of a first local service of a user equipment (UE);
determining, by a remote gateway, to change the UE from the source local gateway to a target local gateway;
sending, by the remote gateway, a first request message to the source local gateway and sending, by the remote gateway, a second request message to the target local gateway, wherein the first request message and the second request message each request establishment of a tunnel between the source local gateway and the target local gateway, wherein the first request message comprises a first identifier of the tunnel, and wherein the second request message comprises a second identifier of the tunnel; and
transmitting, by the source local gateway, a downlink packet of the first local service to the target local gateway using the tunnel, or transmitting, by the target local gateway, an uplink packet of the first local service to the source local gateway using the tunnel.

2. The method according to claim 1, wherein the first request message comprises a user plane identifier of the target local gateway, and the second request message comprises a user plane identifier of the source local gateway.

3. The method according to claim 1, wherein the tunnel is usable for transmitting a packet of the UE between the UE and an application server.

4. The method according to claim 1, wherein the tunnel is dedicated for transmitting a packet of the first local service of the UE.

5. The method according to claim 1, further comprising:
instructing, by the remote gateway, the source local gateway and the target local gateway to exclude packet transmission of a second service other than the first local service using the tunnel.

6. The method according to claim 1, further comprising:
receiving, by the remote gateway from the source local gateway, flow information of the local service; and
wherein the first request message and the second request message further comprise the flow information of the local service.

7. The method according to claim 1, further comprising:
obtaining, by the remote gateway, mobility subscription information of the first local service, wherein the mobility subscription information of the local service indicates that the first local service requires service continuity.

8. The method according to claim 7, further comprising:
determining, by the remote gateway based on the mobility subscription information of the first local service, whether to send the first request message to the source local gateway and whether to send the second request message to the target local gateway.

9. The method according to claim 1, further comprising:
obtaining, by the remote gateway, mobility subscription information of the UE, wherein the mobility subscription information of the UE indicates that the UE requires service continuity.

10. The method according to claim 9, further comprising:
determining, by the remote gateway based on the mobility subscription information of the UE, whether to send the first request message to the source local gateway and whether to send the second request message to the target local gateway.

11. A system, comprising:
a source local gateway, configured to transmit a first packet of a first local service of a user equipment (UE);
a remote gateway, configured to:
determine to change the UE from the source local gateway to a target local gateway; and
send a first request message to the source local gateway and send a second request message to the target local gateway, wherein the first request message and the second request message each request establishment of a tunnel between the source local gateway and the target local gateway, wherein the first request message comprises a first identifier of the tunnel, and wherein the second request message comprises a second identifier of the tunnel; and
the target local gateway;
wherein the source local gateway is configured to transmit a downlink packet of the first local service to the target local gateway using the tunnel, or the target local gateway is configured to transmit an uplink packet of the first local service to the source local gateway using the tunnel.

12. The system according to claim 11, wherein the first request message comprises a user plane identifier of the target local gateway, and the second request message comprises a user plane identifier of the source local gateway.

13. The system according to claim 11, wherein the tunnel is usable for transmitting a packet of the UE between the UE and an application server.

14. The system according to claim 11, wherein the tunnel is dedicated for transmitting a packet of the first local service of the UE.

15. The system according to claim 11, wherein the remote gateway is further configured to instruct the source local gateway and the target local gateway to exclude packet transmission of a second service other than the first local service using the tunnel.

16. The system according to claim 11, wherein the remote gateway is further configured to receive, from the source local gateway, flow information of the local service; and
wherein the first request message and the second request message further comprise the flow information of the local service.

17. The system according to claim 11, wherein the remote gateway is further configured to obtain mobility subscription information of the first local service, wherein the mobility subscription information of the local service indicates that the first local service requires service continuity.

18. The system according to claim 11, wherein the remote gateway is further configured to obtain mobility subscription information of the UE, wherein the mobility subscription information of the UE indicates that the UE requires service continuity.

19. A remote gateway, comprising:

at least one processor; and a non-transitory computer readable medium storing a program for execution by the at least one processor, the program including instructions to determine to change a user equipment (UE) to a target local gateway from a source local gateway configured to transmit a first packet of a first local service of the UE; and send a first request message to the source local gateway and send a second request message to the target local gateway, wherein the first request message and the second request message each request establishment of a tunnel between the source local gateway and the target local gateway, wherein the first request message comprises a first identifier of the tunnel, and wherein the second request message comprises a second identifier of the tunnel;

wherein the source local gateway is configured to transmit at least one of a downlink packet of the first local service to the target local gateway using the tunnel, or the target local gateway is configured to transmit an uplink packet of the first local service to the source local gateway using the tunnel.

20. The remote gateway of claim 19, wherein the program further includes instructions to instruct the source local gateway and the target local gateway to exclude packet transmission of a second service other than the first local service using the tunnel.

* * * * *